United States Patent
Moser

(10) Patent No.: US 10,847,128 B2
(45) Date of Patent: Nov. 24, 2020

(54) GUITAR CASE

(71) Applicant: Moser-Lucido-Production, LLC, Los Angeles, CA (US)

(72) Inventor: Don Louis Moser, Los Angeles, CA (US)

(73) Assignee: Moser-Lucido-Production, LLC, Los Angeles, CA (US)

( * ) Notice: Subject to any disclaimer, the term of this patent is extended or adjusted under 35 U.S.C. 154(b) by 0 days.

(21) Appl. No.: 16/872,976

(22) Filed: May 12, 2020

(65) Prior Publication Data

US 2020/0273438 A1 Aug. 27, 2020

Related U.S. Application Data

(63) Continuation of application No. 16/403,201, filed on May 3, 2019.

(60) Provisional application No. 62/668,053, filed on May 7, 2018, provisional application No. 62/666,674, filed on May 3, 2018.

(51) Int. Cl.
    *G10G 7/00* (2006.01)
    *H04R 1/02* (2006.01)
    *G06F 3/041* (2006.01)

(52) U.S. Cl.
    CPC ............. *G10G 7/005* (2013.01); *G06F 3/041* (2013.01); *H04R 1/025* (2013.01); *H04R 2420/07* (2013.01)

(58) Field of Classification Search
    CPC .................................................... G10G 7/005
    See application file for complete search history.

(56) References Cited

U.S. PATENT DOCUMENTS

| | | | | |
|---|---|---|---|---|
| 1,961,137 | A * | 6/1934 | De Haan | A47F 3/145 312/71 |
| 2,226,900 | A * | 12/1940 | Dickerson | G10H 1/32 206/314 |
| 2,231,235 | A * | 2/1941 | Weir | B65D 85/54 206/314 |
| 5,379,891 | A * | 1/1995 | Coleman | A47C 9/08 108/119 |
| 5,590,771 | A * | 1/1997 | Cota | A45C 9/00 190/102 |
| 6,398,322 | B1 * | 6/2002 | Chaplin | A47F 3/005 312/114 |
| 6,612,483 | B2 * | 9/2003 | Harris | B65D 5/2014 206/314 |

(Continued)

*Primary Examiner* — Robert W Horn
(74) *Attorney, Agent, or Firm* — Davidson Law Group, ALC; Payam Moradian

(57) ABSTRACT

Provided is a guitar case that can include a body for placement of a guitar; a translucent or transparent window where a portion of the guitar is visible from outside of the case; and a speaker; wherein the guitar placed inside of the case is configured to play over the speaker with a wired or wireless connection. The guitar case can further include a panel or a screen. The screen can be a touch-screen. The panel can be configured to move to allow access to electronics inside of the case. The panel can pivot out. The guitar case can further include a door, the door having the window. The guitar case can further include a camera or a microphone. The case can be configured so that a guitar is placed at an angle of less than vertical.

18 Claims, 19 Drawing Sheets

(56) References Cited

U.S. PATENT DOCUMENTS

| | | | | |
|---|---|---|---|---|
| 6,685,283 B2 * | 2/2004 | Gembar | ................... | A47F 3/00 |
| | | | | 248/176.1 |
| 6,959,810 B2 * | 11/2005 | Neilson | ................. | A45C 11/24 |
| | | | | 206/204 |
| 7,090,313 B1 * | 8/2006 | McMurray | .............. | A47F 3/005 |
| | | | | 312/114 |
| 7,290,653 B2 * | 11/2007 | Izen | ......................... | A47F 7/00 |
| | | | | 206/314 |
| D637,175 S * | 5/2011 | Terry | ........................... | D14/188 |
| 8,022,285 B2 * | 9/2011 | Zhang | ....................... | G10G 7/02 |
| | | | | 84/455 |
| 8,912,901 B2 * | 12/2014 | Hoeth | .................... | G10G 7/005 |
| | | | | 340/540 |
| 8,955,673 B2 * | 2/2015 | Sauter | ..................... | G10G 7/00 |
| | | | | 206/14 |
| 2003/0192795 A1 * | 10/2003 | Izen | ....................... | A45C 11/10 |
| | | | | 206/314 |
| 2007/0158509 A1 * | 7/2007 | Hubbell | ................. | G10G 7/005 |
| | | | | 248/171 |
| 2008/0047855 A1 * | 2/2008 | Izen | .................. | B65D 21/0202 |
| | | | | 206/314 |
| 2013/0322673 A1 * | 12/2013 | Yuhara | ................... | G10G 7/005 |
| | | | | 381/334 |
| 2014/0123513 A1 * | 5/2014 | Ciffin | ..................... | F26B 9/003 |
| | | | | 34/82 |
| 2018/0007458 A1 * | 1/2018 | DeJarnette | ............. | H04R 1/028 |
| 2019/0228751 A1 * | 7/2019 | Shurte | ...................... | G10G 5/00 |

\* cited by examiner

GUITAR CASE

CROSS-REFERENCE

The present application is a continuation of Ser. No. 16/403,201, filed on May 3, 2019, which claims the benefit of provisional U.S. Appl. No. 62/666,674, filed on May 3, 2018 and provisional U.S. Appl. No. 62/668,053, filed on May 7, 2018, which are both incorporated herein by reference in their entirety.

BACKGROUND SECTION OF THE INVENTION

Guitars are typically kept in a guitar case. Existing guitar cases typically lack a decorative look and functionality beyond providing protection for the guitar. There is a need in the art for a guitar case that has a decorative look and additional functionalities.

SUMMARY SECTION OF THE INVENTION

Provided is a guitar case comprising a door with a window. The door can be hinged to the body. The guitar case can further comprise, one or more decorative panels on the window. The guitar case can further comprise lights, such as LED light strips positioned around the window, one or more speakers accessible through the window and/or attached to the window, one or more wireless protocols for receiving data and/or instructions, microphone, camera and/or a screen. The guitar case can wirelessly or with a wired connection receive audio to be played on the speaker and/or receive instructions from, an App on a phone or other electronic devices. Also provided is a decorative unit that can be mounted on a wall, and is smaller, and has all the functionalities of the guitar case but may not be configured to hold a musical instrument. The decorative unit can have an access door with a window in front, or fixed window in the front and access in the back.

Provided is a guitar case that can include a body for placement of a guitar; a translucent or transparent window where a portion of the guitar is visible from outside of the case; and a speaker; wherein the guitar placed inside of the case is configured to play over the speaker with a wired or wireless connection. The guitar case can further include a panel or a screen. The screen can be a touch-screen. The panel can be configured to move to allow access to electronics inside of the case. The panel can pivot out. The guitar case can further include a door, the door having the window. The guitar case can further include a camera or a microphone. The case can be configured so that a guitar is p aced at an angle of less than vertical.

Provided is a guitar case that can include: a body for placement of a guitar; a door pivotally attached to the body; a translucent or transparent window on the door where a portion of the guitar is visible from outside of the case; and a speaker placed on the door; wherein the guitar placed inside of the case is configured to play over the speaker with a wired or wireless connection. The window can be wider on bottom of the door where a body of the guitar faces, and the window is narrower on top. The speaker can be placed next to the narrow portion of the guitar case. The guitar case can include a fan. The guitar case can further include a panel or a screen on the door. The screen can be a touch-screen. The panel can be configured to move to allow access to electronics inside of the case. The panel can pivot out. The speaker can take internal space inside the case and case is configured so that the guitar's neck is placed next to the speaker. The case can be configured so that a guitar is placed at an angle of less than vertical. The case can further include LED strips inside of the case along at least a portion of the window.

Provided is a decorative fixture for mounting on a wall comprising: a) a hollow body; b) a door pivotally attached to the body; c) a translucent or transparent window on the door; d) a speaker placed on the door; and e) a touch screen; wherein a user can pair a guitar with the speaker to play music.

DETAILED DESCRIPTION OF THE INVENTION

Figure 1:
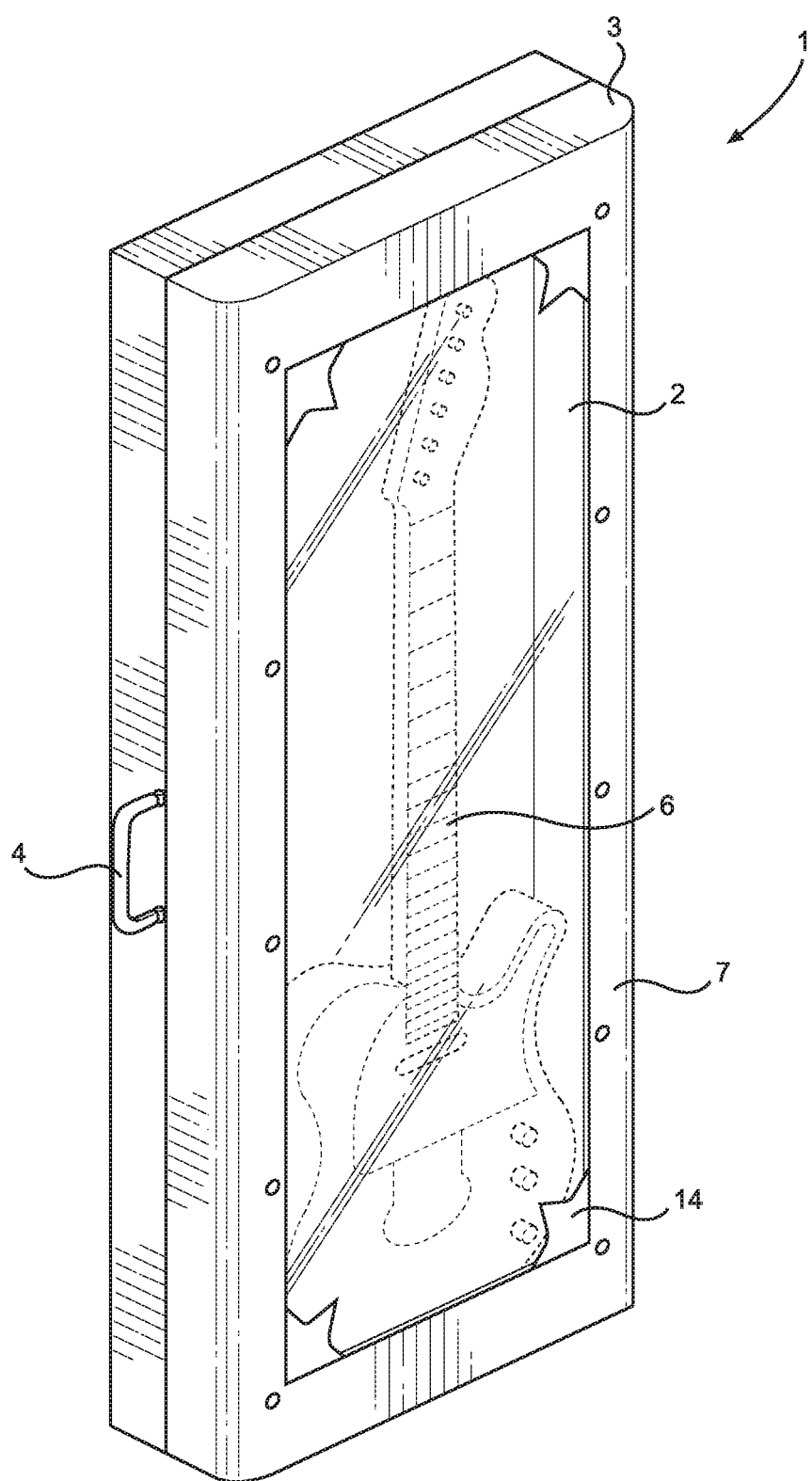
FIG. 1 illustrates a perspective view of a guitar case with a transparent window and without a speaker.
Figure 2:
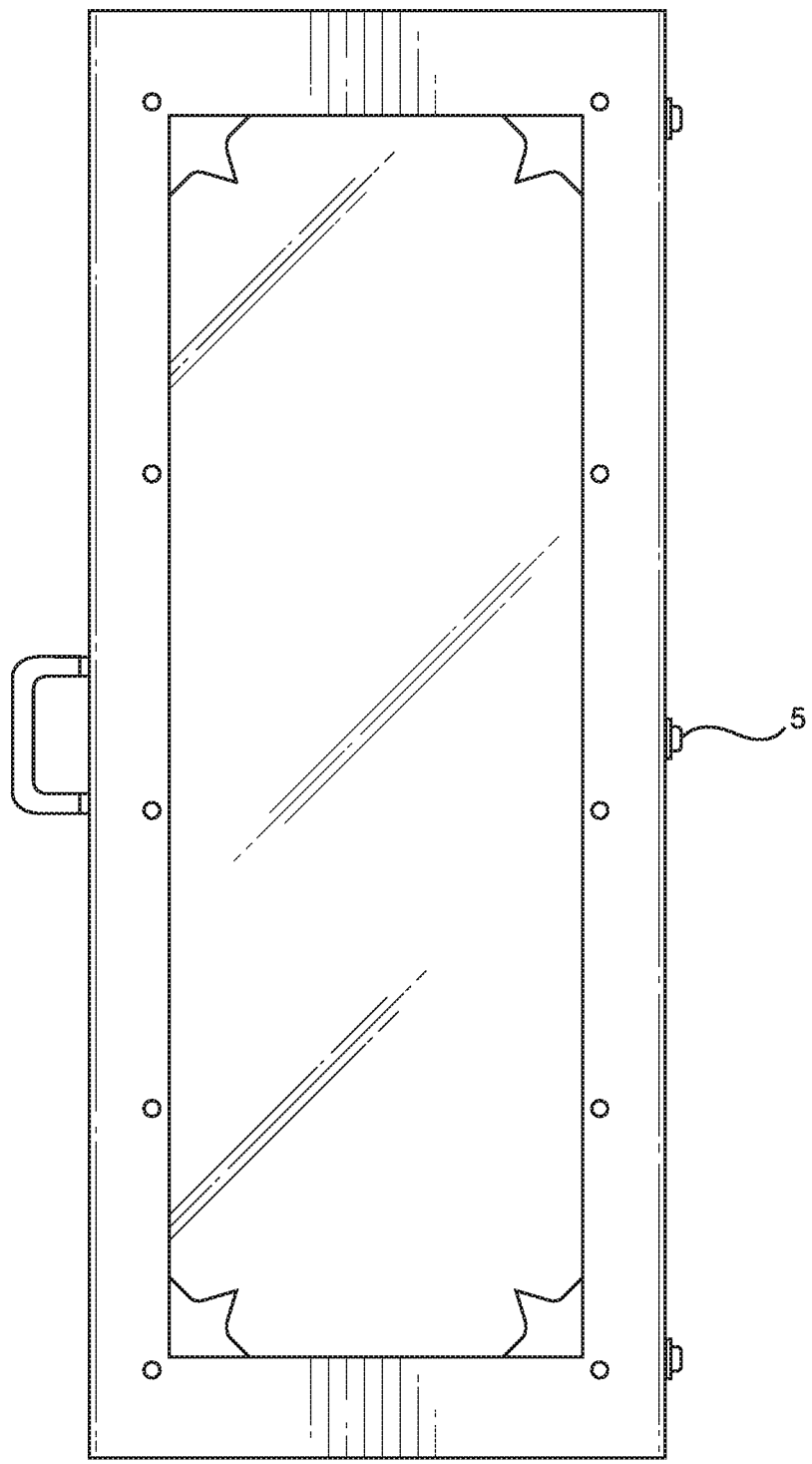
FIG. 2 illustrates a front view of a guitar case with a transparent window and without a speaker.
Figure 3:
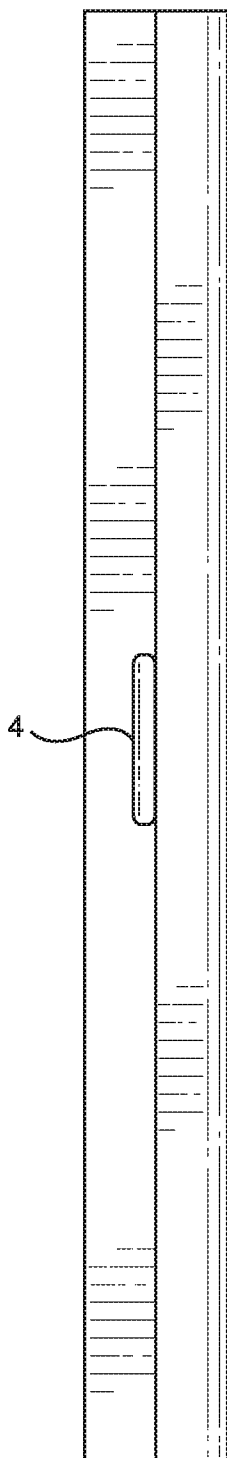
FIG. 3 illustrates a side view of a guitar case with a transparent window and without a speaker.
Figure 4:
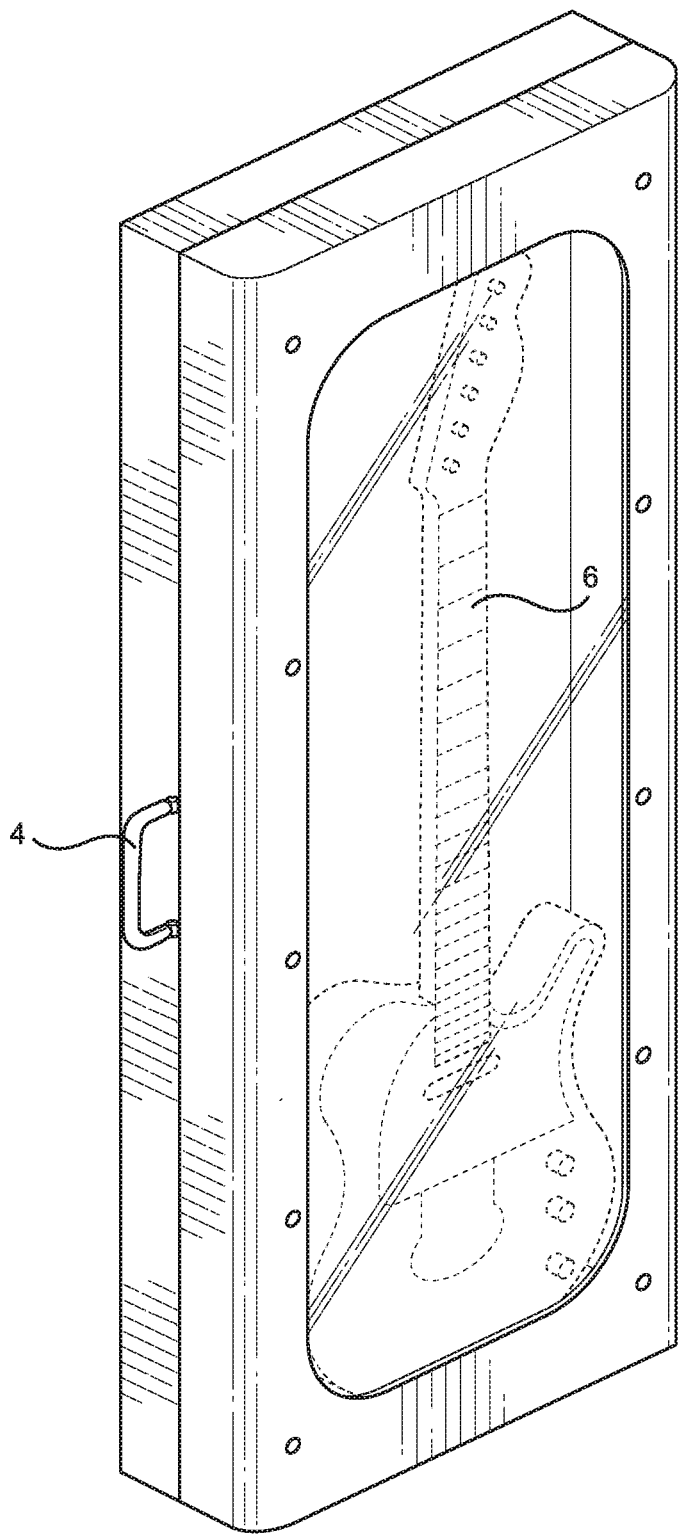
FIG. 4 illustrates a perspective view of a guitar case with a transparent window and without a speaker.
Figure 5:
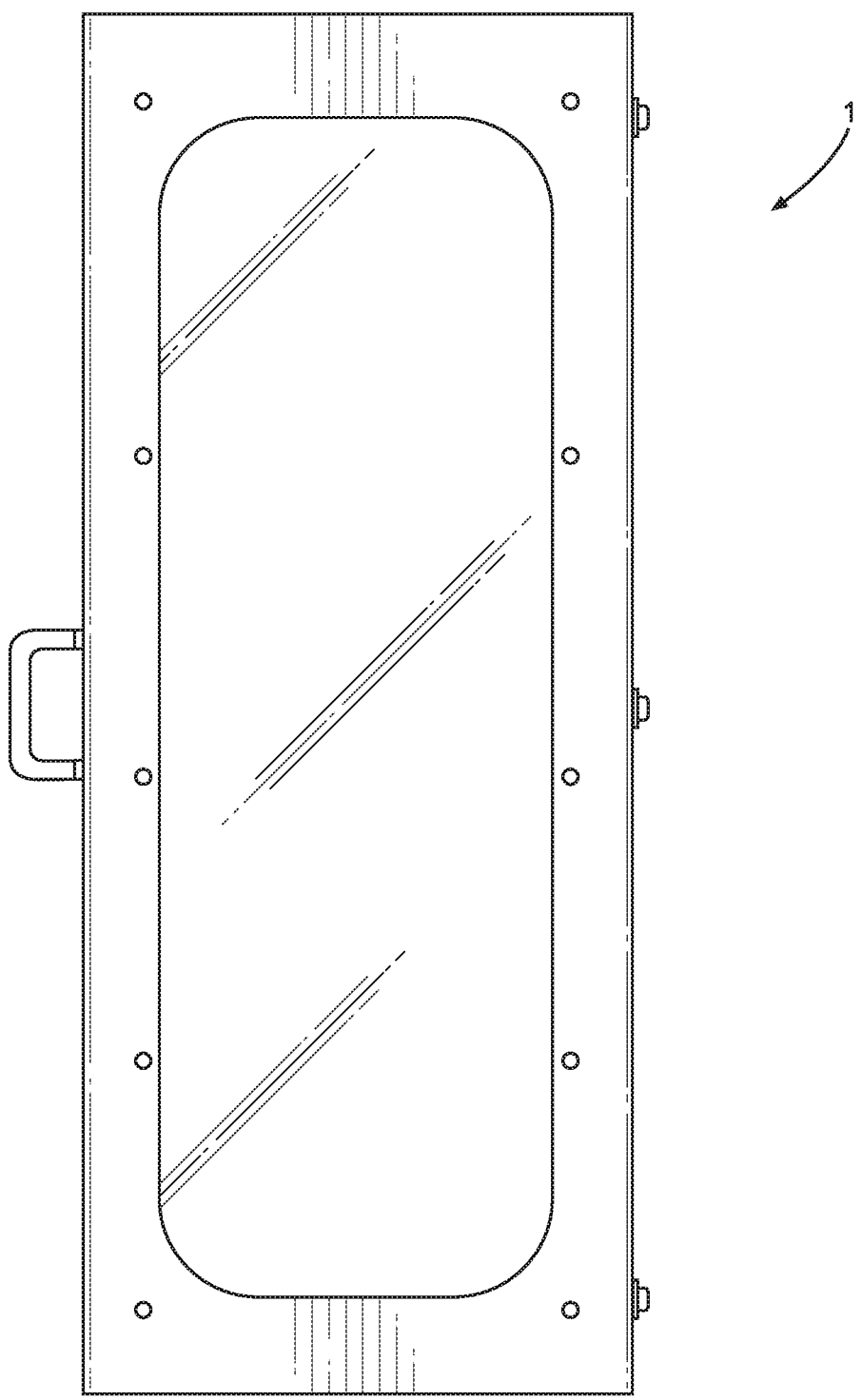
FIG. 5 illustrates a front view of a guitar case with a transparent window and without a speaker.
Figure 6:
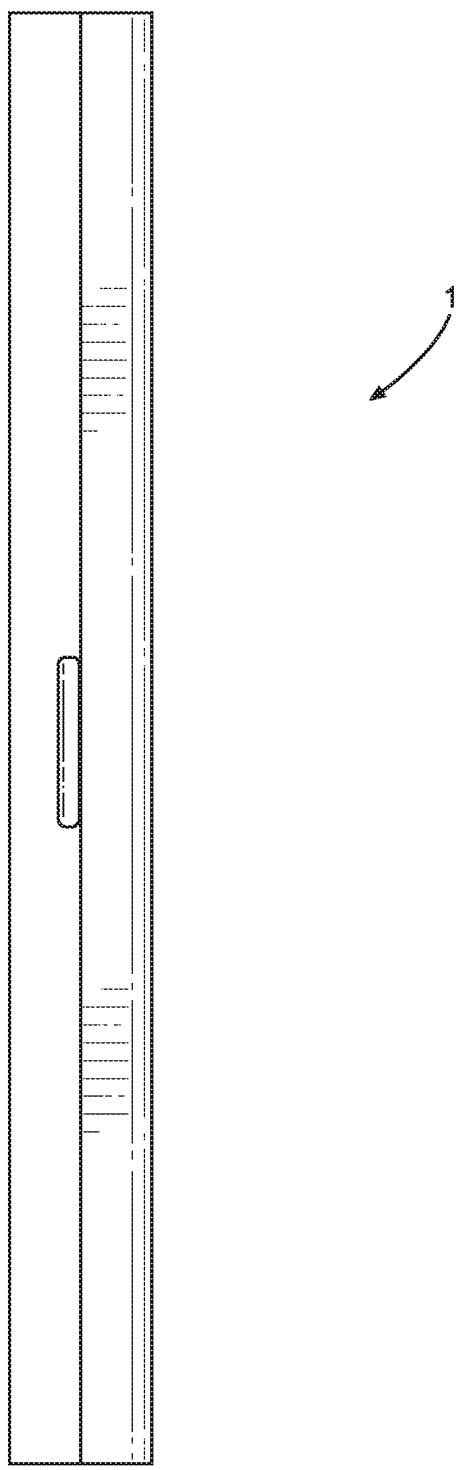
FIG. 6 illustrates a side view of a guitar case with a transparent window and without a speaker.
Figure 7:
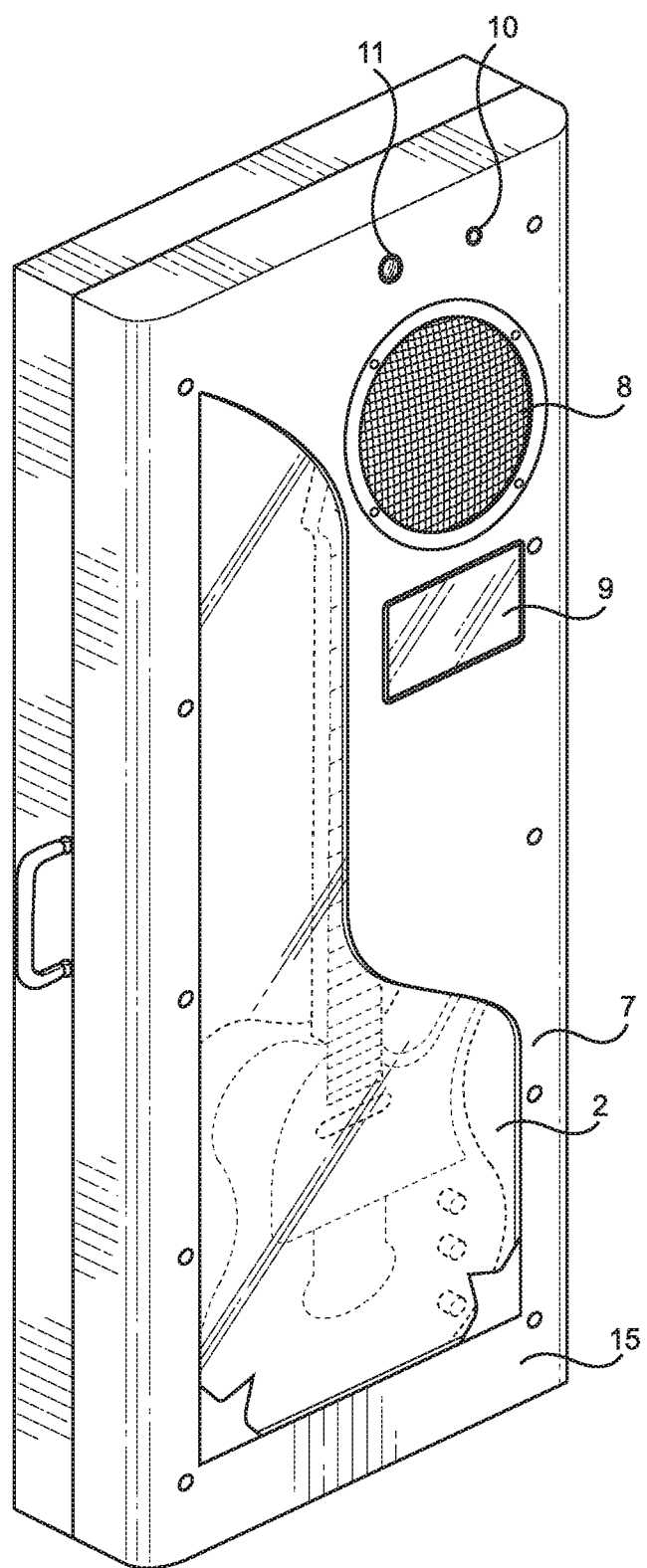
FIG. 7 illustrates a perspective view of a guitar case with a transparent window and with a speaker.
Figure 8:
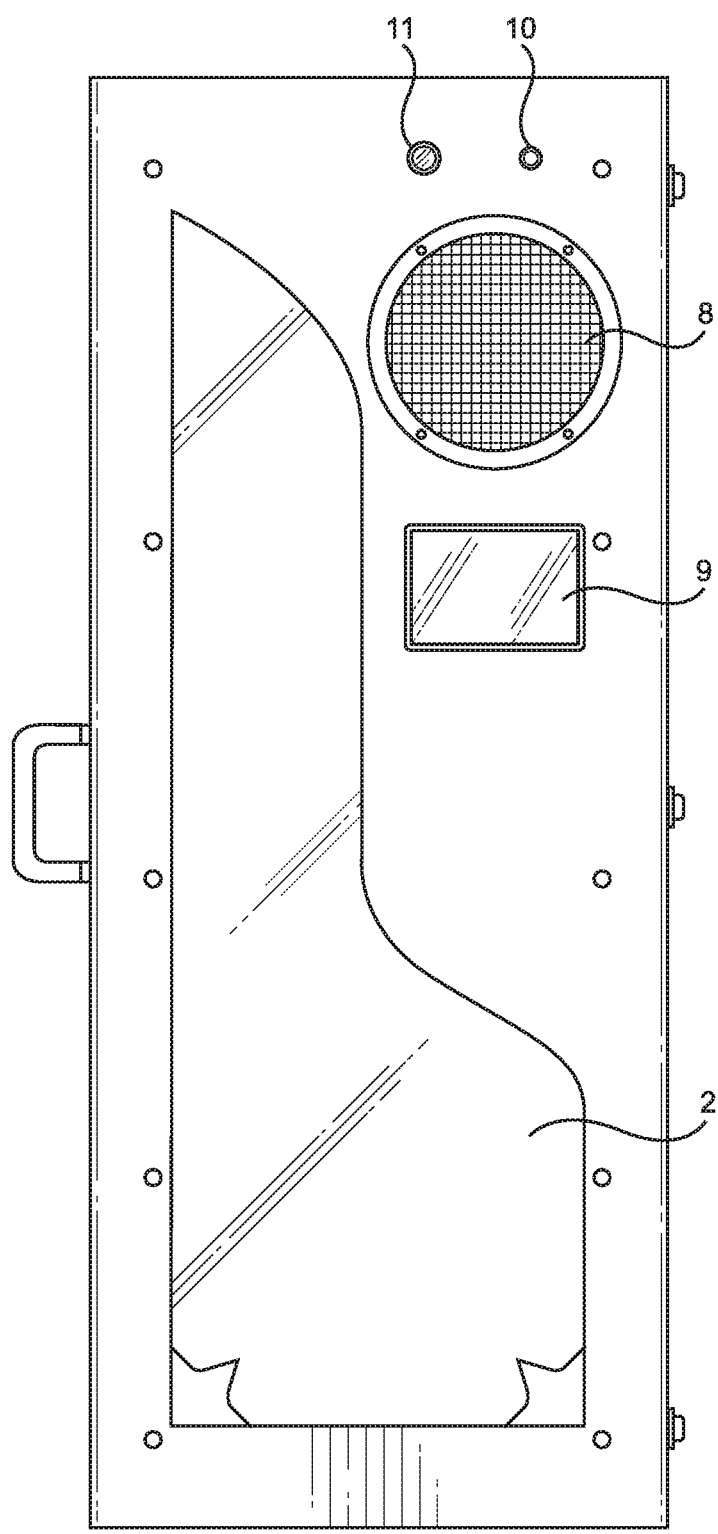
FIG. 8 illustrates a front view of a guitar case with a transparent window and with a speaker.
Figure 9:
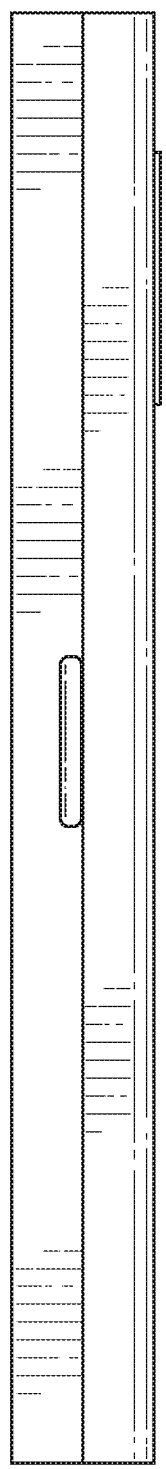
FIG. 9 illustrates a side view of a guitar case, with a transparent window and with a speaker.
Figure 10:
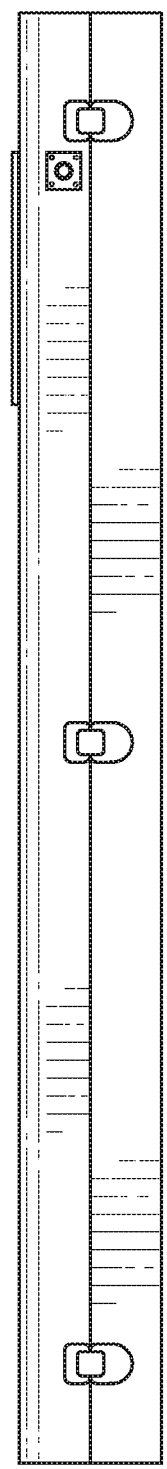
FIG. 10 illustrates a side view of a guitar case with a transparent window and with a speaker.
Figure 11:
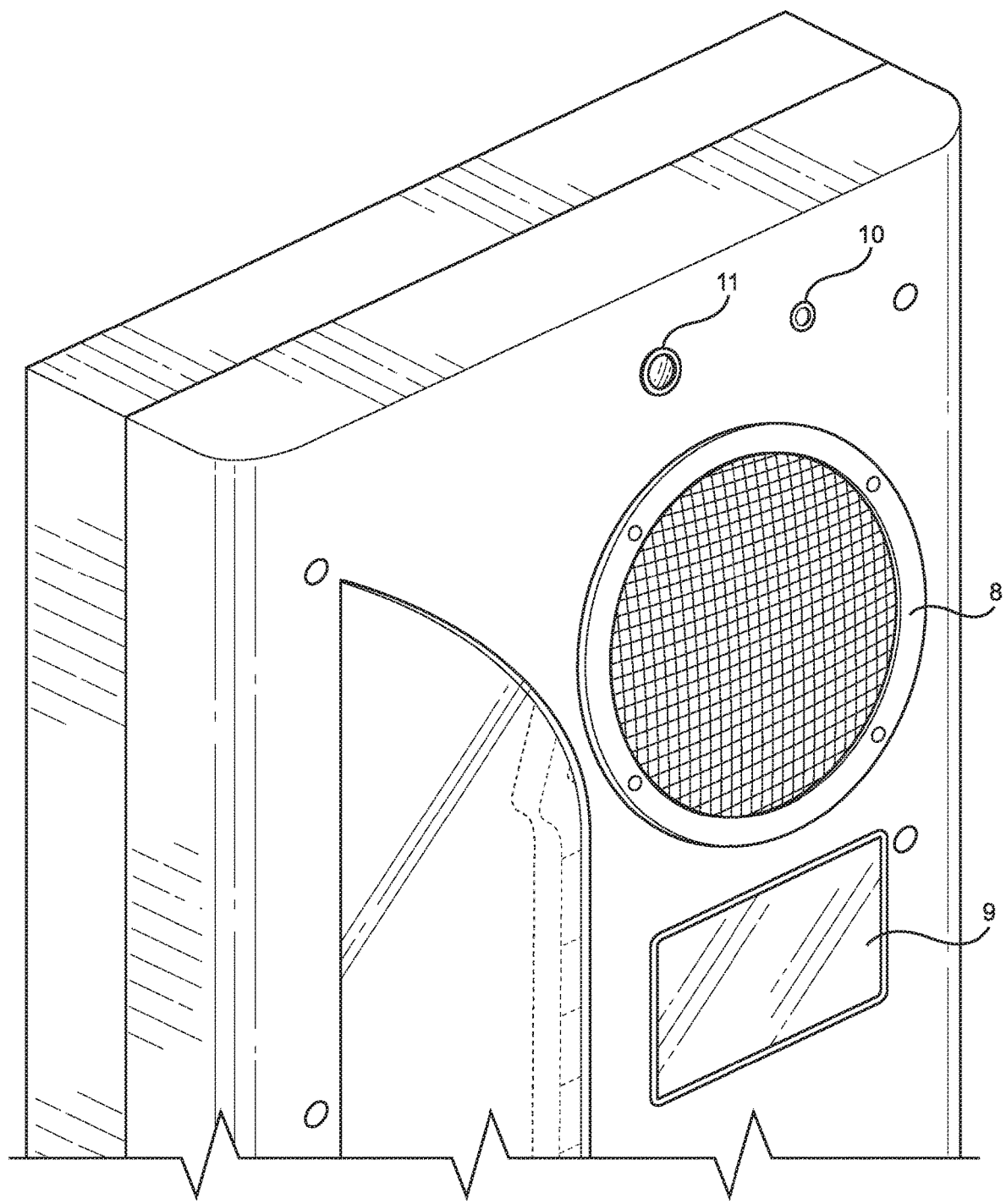
FIG. 11 illustrates a close-up of a perspective view of a guitar case with a transparent window and with a speaker.

Provided is a guitar case 1. The case 1 can have a body with a cavity for placement of the guitar 6 and accessories. The guitar case can have a hinged door 7 pivotally connected to the body. The body can have a handle 4. There can be one or more locks/latches on the case for securing the body to the door 7. The guitar case 1 can also have a window 2.

Figure 20:
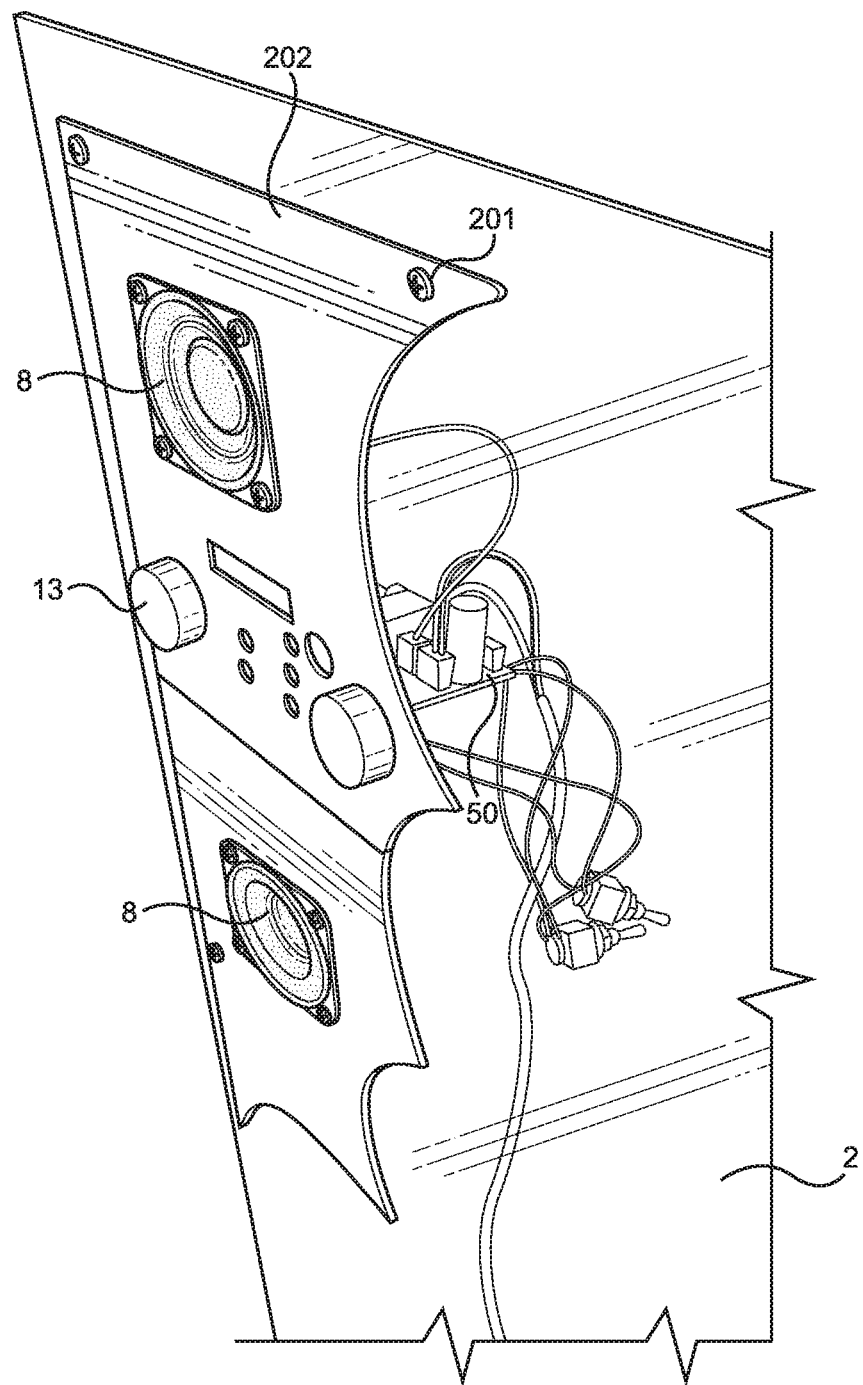
FIG. 20 illustrates use of a decorative element (attached to glass) in form of a sheet on front of a guitar case.

FIGS. 1-6 illustrate a rectangular guitar case 1 with a rectangular window 2. The guitar 6 is placed inside of the guitar case 1 and is visible through window 2. Window 2 can be any shape such as polygon with sharp or round corners, oval or circular. The guitar case 1 can have a handle 4. A hinge 5 is placed on opposite side of handle 4. A panel 14/202 (shown in FIG. 20) in the form of a plaque or other forms can also be attached to window 2.

The hinged door 7 can have a window 2. The window 2 can be made from a transparent or translucent material. The material for the window 2 can be glass, or a synthetic organic material, like plastic, plexi-glass, or other material. The window 2 can also be made from a material that is either not transparent or less transparent when not lighted, and when a light is placed behind the material, the material may become more transparent. An example of such material is a two-way mirror.

FIGS. 7 to 13 illustrate a guitar case 1 with a speaker 8. Window 2 is customized to be wider on bottom and narrower on top. Window 2 can be in the shape of a horizontal line on bottom, two vertical lines coming up, with one of the vertical lines moving inward as it moves up, so to length of window in a top portion (70% from bottom of the case 1) be 30% to 60% compared to the lower portion. In this configuration, all or up to 75% of the body of guitar 7 can be visible through the window.

FIGS. 7 to 13 illustrate placement of speaker 8 on case 1. The speaker 8 can be placed off-center, either to the right or left of the center. Speaker 8 can be off-set from one side of the case 1 by 2 or 3 inches or more (from the side of the speaker 8 that is closest to side of case 1). The speaker 8 as illustrated is round but can also have other shapes. The speaker 8 can be placed next to a narrower region of the window on top.

Below (or in other locations) the speaker 8, a screen/panel 9 is placed. The panel 9 can be decorative/non-functional in nature, and be made up of metal, plastic, or other materials. Alternatively, instead of the panel a screen 9 is placed. The screen 9 can be a touch screen or a regular non-touch screen, and can be an LED, OLED, nor LCD screen. The screen 9 can provide a user with the status of the guitar case 1 and/or allow the user change the audio settings of guitar case 1.

Figure 12:
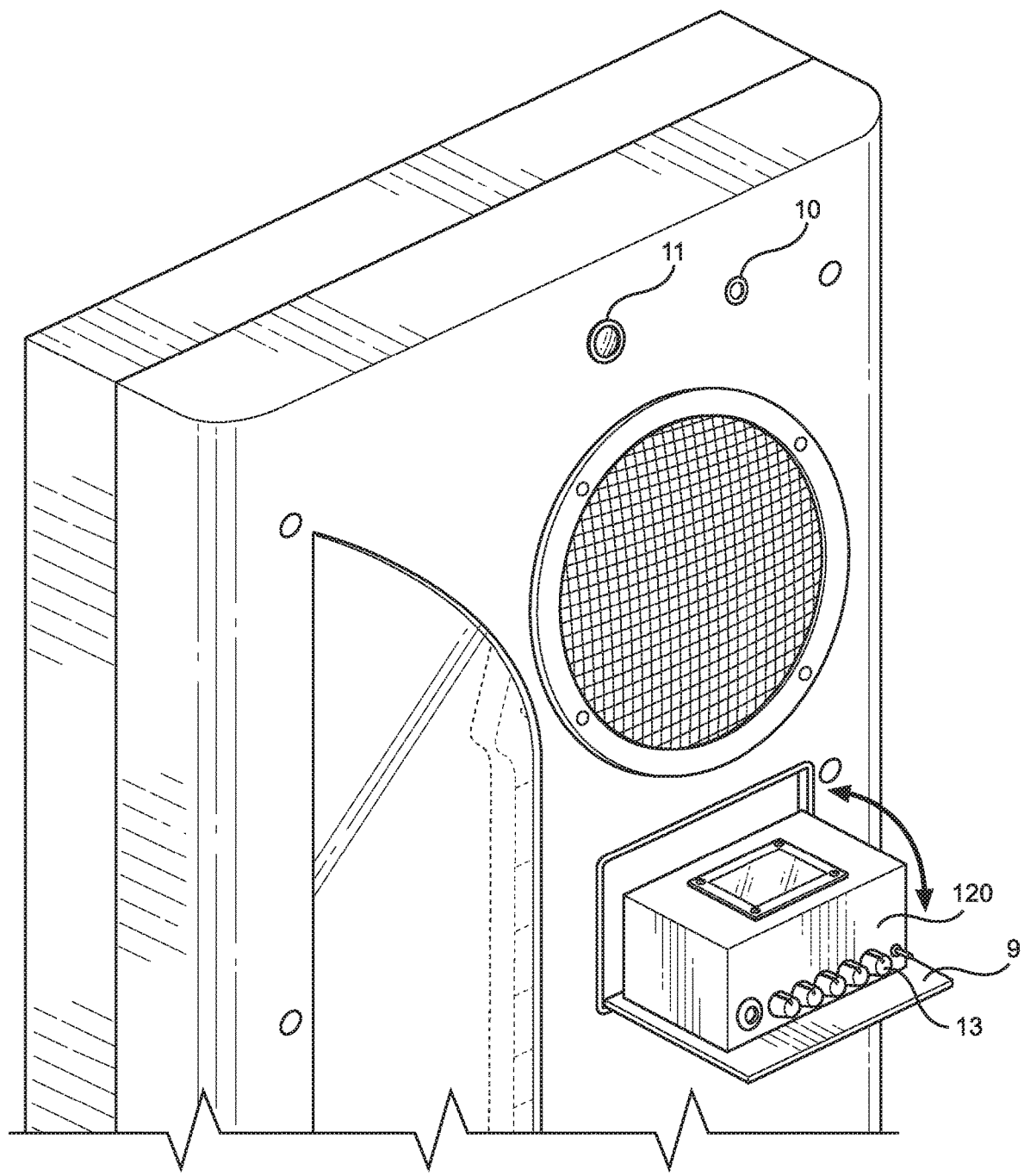
FIG. 12 illustrates a perspective view of a guitar ease with a transparent window and with a speaker, with a panel in an open position.

FIG. 12 illustrates the screen/panel 9 pivoting out to make an electronics housing 12 inside of guitar case 1 accessible to a user. The screen/panel 9 is pivotally attached. In an open position, knobs 13 are accessible to a user to change the audio settings.

Figure 13:
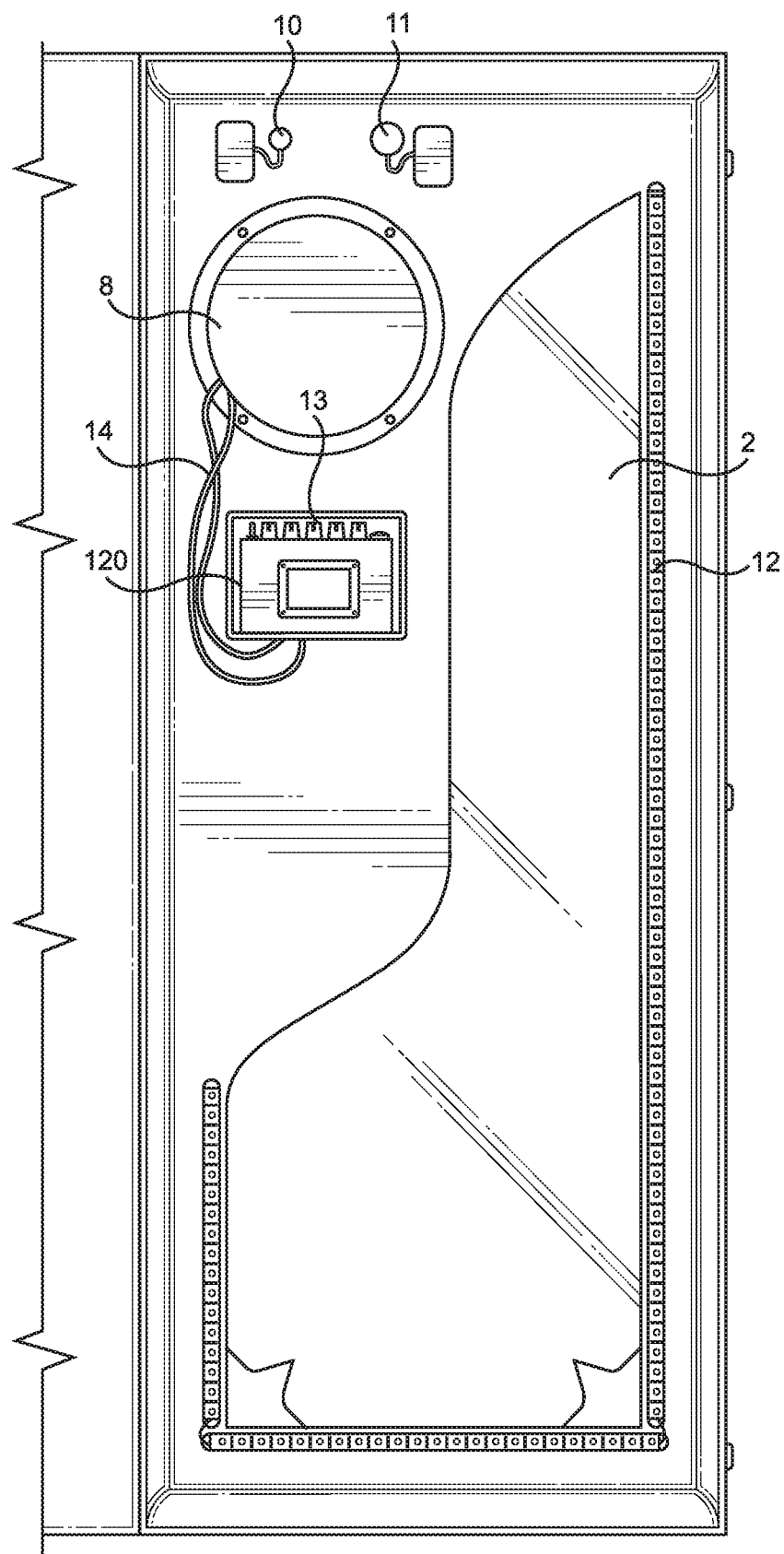
FIG. 13 illustrates inside of a door of a guitar case with a speaker.
Figure 16:
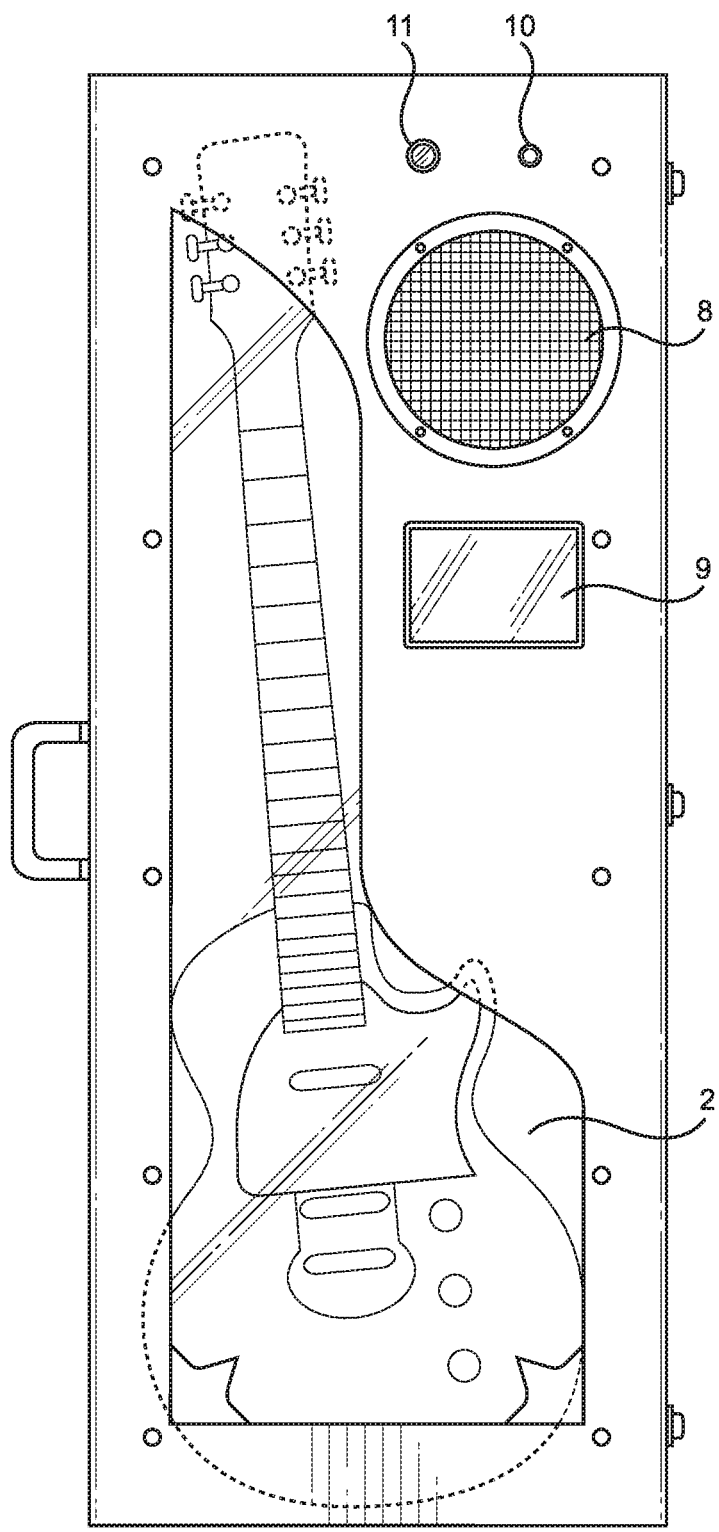
FIG. 16 illustrated placement of a guitar at an angle in the guitar case to the internal presence of the speaker.
Figure 17:
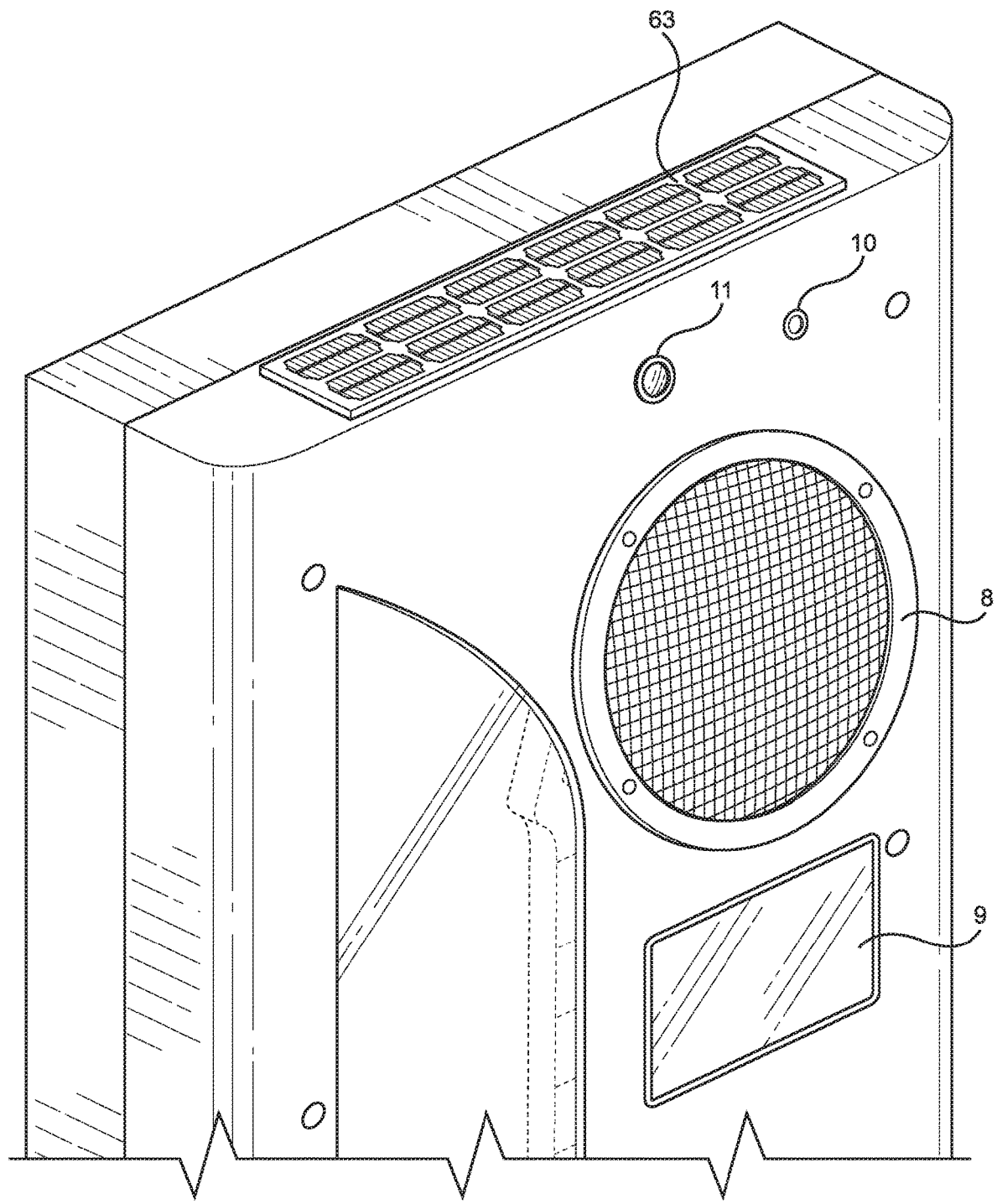
FIG. 17 illustrates a guitar case with a speaker and a solar panel on top.

FIG. 13 illustrates the back of front door 7 of guitar case 1. Speaker 8 and electronics housing 120 placed behind front door 7. The electronics housing 120 and the speaker 8 can be connected with wires 14. Microphone 9 and camera 11 are also visible in this view. The speaker 8 and the electronics housing 120 come inside of case 1. The neck of the guitar 6 can be placed on the side of the speaker 8 inside of case 1. The case 1 can be configured so that the guitar is stored at an angle of 85 degrees to 70 degrees (the angle is determined by drawing a straight line from the center of the neck to the body, and comparing the angle to a horizontal line in the direction of neck). The guitar 6 placed at an incline inside of the case 1 is illustrated in FIG. 16.

One or more LED light strips 12 or other suitable strips emitting light can be placed around the window, on the inside of the case 1. The light strips 12 can be placed around a portion of the window 2 or around the entire window. For example, with a rectangular window, two pairs of parallel strips of LED's or other lights can be placed all around the window. As illustrated in FIG. 13, LED lights 12 can be placed on inside of front door 7 around some or all of window 2. The LED strips 12 may not be visible from outside. As shown in FIG. 13, window 2 has three straight sides and a curved connecting portion. The LED strip 12 is placed all around window 2.

Figure 19:
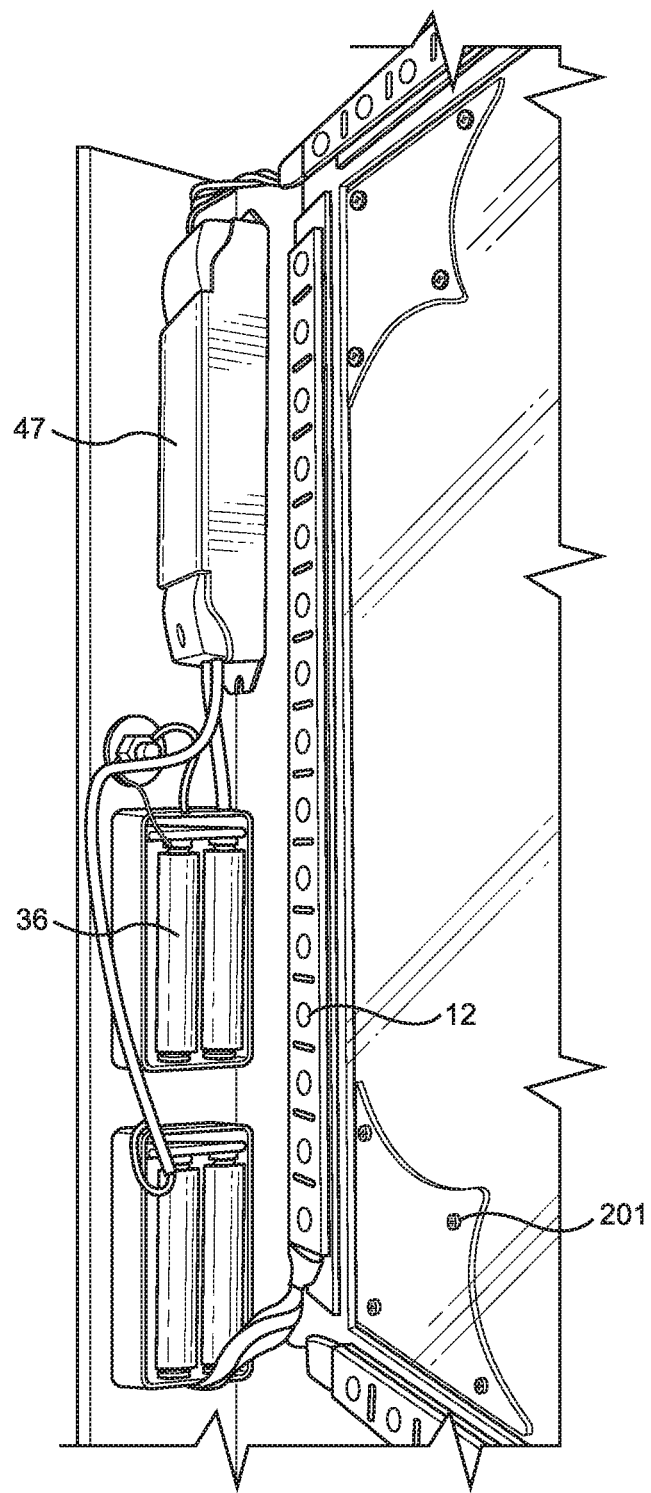
FIG. 19 illustrated placement of a battery and a driver inside the guitar case on the bottom behind an opaque portion.

As illustrated in FIG. 19, one or more rechargeable batteries can be placed inside of the guitar case 1. One specific place is the bottom of the case 1 below the window 2 for placement of the batteries. The bottom 1-6 inches of the case can be opaque (where window 2 is not attached). As illustrated in FIG. 19, the battery 36 and driver/PMU 47 can be placed behind the bottom portion (opaque) of the case 1. Plug 130 can be used to attach an external source of electricity. Another place for placement of rechargeable battery is electronics housing 120 behind panel 9.

The guitar case 1 an have one or more circuit boards 50, which can be attached to the window 2 or be inside of electronics housing 120. The circuit boards 50 can have electronics configured for communication with one or more wireless protocols (such as two wireless protocols). For example, VHF 53 and UHF radio communication can be used to communicate in a wireless fashion with the guitar 7 to receive audio signals. Alternatively, the guitar 7 can be plugged in. An amplifier 46 and/or receiver can be in communication with the circuit board 50 to receive the audio signal. There can also be another jack 54 for headphones.

There can also be a Bluetooth chip 56 on the same or different circuit board 50. The Bluetooth chip 56 can communicate with an external electronic device like a smart phone or a tablet computer or a smart watch 80. The Bluetooth communication can receive signals from Apps for music, or assistants such as ALEXA or GOOGLE Home or SIRI. A user can play music with the App, resulting in transmission of audio signals through Bluetooth, and playing of the music or other audio from the speaker on the case. A user can play the music alone (from an outside source), the guitar generated sound alone, or both simultaneously.

The Circuit Board 50 can have a CPU 35 for processing various instructions. The circuit board 50 can be in communication with a PMU 47 which can separately be placed at the bottom of the case. The PMU 47 can regulate current and voltage. The circuit board 50 can be in communication with an LED driver 57 for controlling power to the LEDs 12. The LED driver 57 can adjust the LED power and/or color automatically 91 depending on the beat and/or tempo (waive form) of the music. Alternatively, the LED driver 57 can be in a separate circuitry, and placed on the bottom of the case 1.

The case 1 can have a GPS chip 58 for transmitting the location of the chip.

Other optional electronics include an audio processor 60, graphics processor 61, camera 11, microphone 9, and monitor screen 9a. The camera 11 can take videos that can be stored on a memory 59 and or played on the monitor 9a. The video can be accessible from the App 81 at a later point in time. Audio can be recorded with a microphone 10 and stored and/or played live.

The case 1 can have a remote 62 that can turn on/off the electronics, adjust volume, turn on off the lights, change color of lights, or enable audio input.

In addition to or in place of Bluetooth radio protocol, the electronics can communicate with WiFi or other protocols where the devices connect to the Internet. The various devices can communicate through the cloud.

The guitar case can also have a fan 66 for moving air. The fan 66 can be connected to the same or different battery 36 as the other components. The battery of the fan and/or other components can be charged with a solar panel 63.

Figure 15:
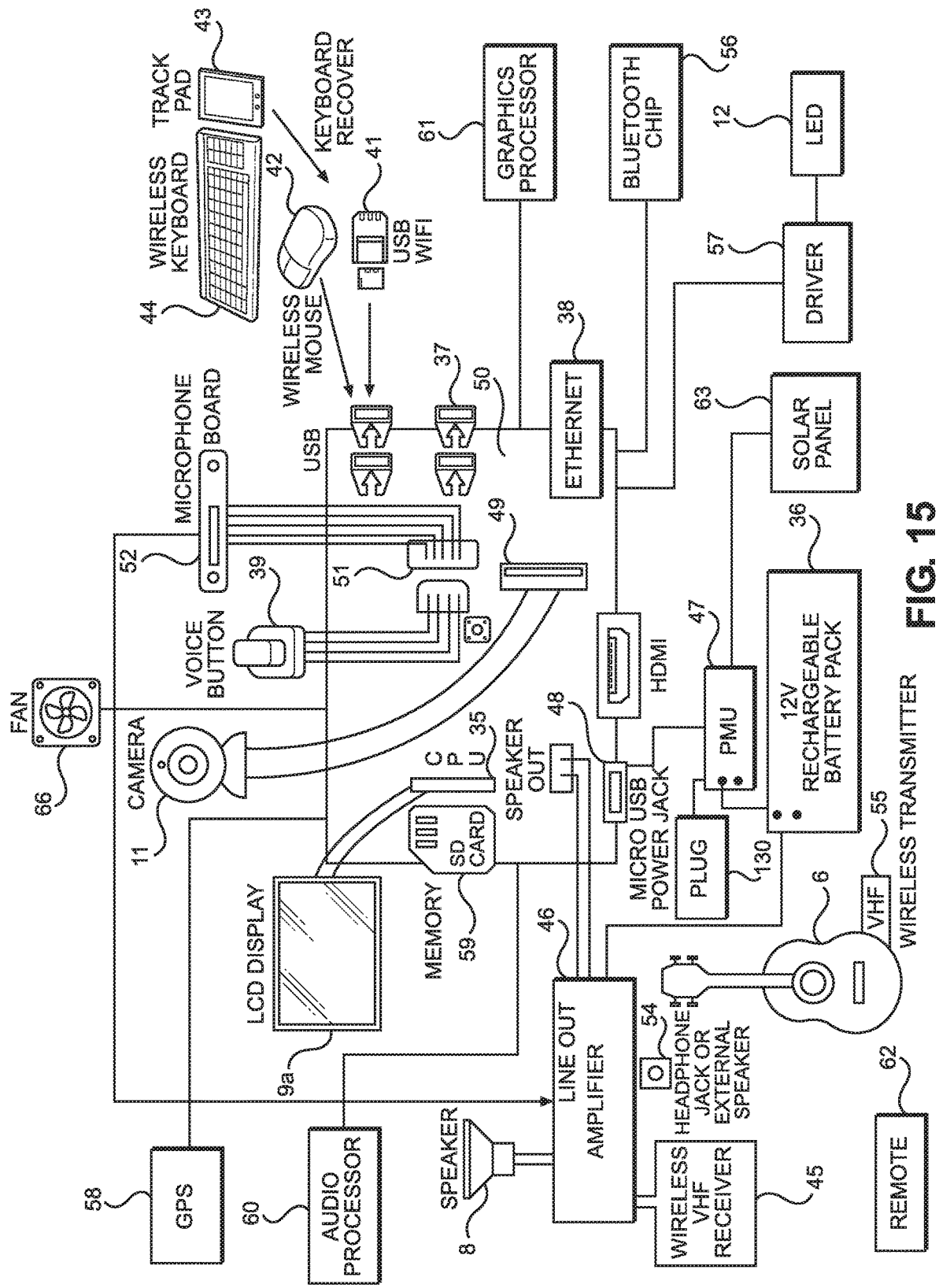
FIG. 15 illustrates various electronic components of the guitar case.

FIG. 15 illustrates the electronics components of guitar case 1. Illustrated is circuit board 50. Many of the electronic components can be in communication with circuit board 50. The board 50 can have a central processing unit 35, and additional processors such as Bluetooth chip 56, audio processor 60, GPS processor 58, and graphic processor 61. Ports 37 (in form of USB ports or other ports) can be used for connecting memory sticks or other components. Port 37 can for example be used for connecting directly or indirectly a mouse 42, a keyboard 44, a track pad 43, or a USB 41 with an internal WiFi unit.

A power management (PMU) unit 47 can be in electronics communication with circuit board 50. The PMU 47 can change the voltage/current as needed. The rechargeable battery 36 can be in communication with the PMU 47. A Micro USB power jack 48 (or other ports) can also be used for either powering peripheral devices or accepting charge from an external source of power. Solar panel 63 can also be in electronics communication with battery 36 and/or PMU 47, and can be used to charge the battery 36 or power fan 66.

An audio processor 60 can be in communication with circuit board 50. An amplifier 46 can be used to amplify the sound for playing over speaker 8. A wireless VHF receiver 45 can be used to receive signals from, a VHF or other wireless transmitter 55 on a guitar. A jack 54 can be present for attaching a headphone or an external speaker. There can also be a port 52 for attaching an external headphone/microphone. The microphone board 52 and other electronic communications can be attached to board 50 with bus 51. A voice button 39 can also be used to activate the microphone when pressed.

Port 65 can accept ST) card 59 or other forms of physical memory. The memory can be used to record/play over camera 11 and/or display 9a. The SD card can be inserted into port 49.

LED 12 can be powered by a driver 57 which receives power from the battery 36.

Figure 14:
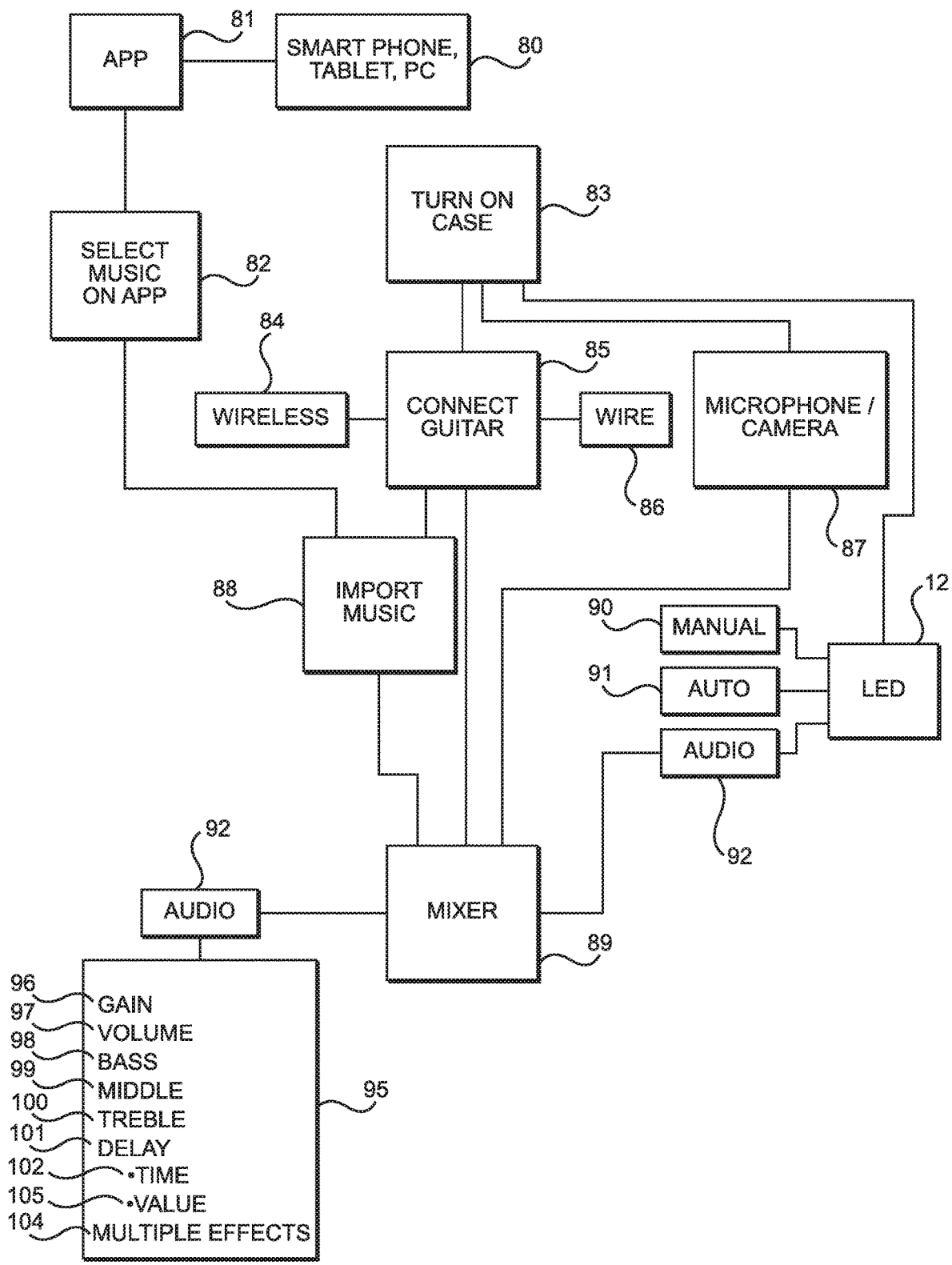
FIG. 14 illustrates a flow chart for using the guitar case to play music.

FIG. 14 provides a flow chart on how a user may use the guitar case 1. A user can turn on 83 the case 1, connect the guitar to the guitar case's electronics either in a wired 86 or wireless 84 fashion. The microphone and/or camera a f the case can also be turned on automatically or separately. LED 12 can also be turned on automatically or manually with a separate switch. LED 12 can also turn on and off/change color automatically according to audio 92 levels/quality. A user can use an electronics device such as a smart phone, tablet computer, smart watch, or a personal computer 80 to play music. An App 81 (application) can be used to select music 82 to import 88 desired music. A mixer 89 can be used for changing the quality and the levels of audio 92 signals, including audio qualities 95 such as gain 96, volume 97, bass 98, middle 99, treble 100, delay 101 in time 102 and value 103, and multiple effects 104.

To use the case 1, a user opens the case and takes the guitar out. The user can then turn on the electronics in the case, either with a physical switch or remotely with remote control 62 or an app. The user can then connect the guitar either with a wire or wirelessly. The user can then play the guitar alone, play the guitar with music imported by the user, play the imported music alone, and/or play additional audio from a microphone. In any of these conditions, the music can be played over a speaker 8 attached to the case 1. A user can use an external jack on the case to attach a headphone or an external speaker to the case. A user can either manually or automatically turn on the LED lights, which can also be responsive to the audio beat to produce a visual effect. A user can also adjust various parameters such as gain 96, volume 97, bass 98, middle 99, treble 100, delay (time, value) 101, and also multiple other effects.

Figure 18:
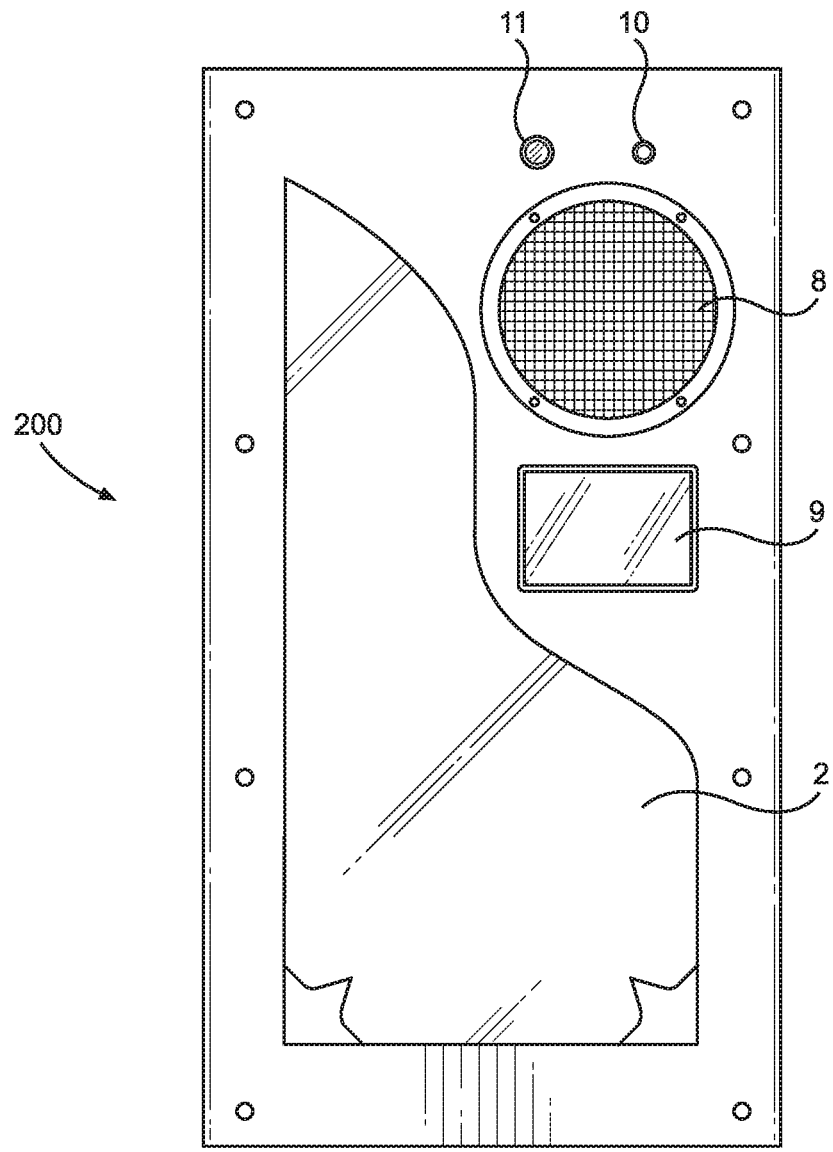
FIG. 18 illustrates a decorative fixture for mounting on a wall.

FIG. 18 provides an interactive decorative fixture 200. It can also be portable. It could function just as the previously described guitar case 1 without being an actual case or cavity to store a guitar. The decorative fixture can be connected by Bluetooth, UHF/VHF, WIFI, or any other available Tireless or wired technology which supports communication with search engines such as SIRI, ALEXA, or GOOGLE Home, and also with web browsers and Apps like SPOTIFY.

The decorative fixture 200 can have one or more speakers 8 that connect to the network sources. The speaker 8 could hook up to a wireless UHF/VHF transmission from a guitar or other electric instrument. The speaker 8 could also hook up to a guitar by hard wiring through an input jack. The decorative fixture can contain LED 12 or other lighting strips which can be controlled by remote or external apps. The ambient lighting can be color selective, set to be changing color automatically, or set to change to match audio input from source. A user can play along with a favorite artist, look up movie times, check the weather, or record jamming.

The interactive art piece could have a front door 7 on a hinge which allows you to access the interior and circuitry. It could also be without an opening door and have instead a window to view lighting and contents. It could have a handle on top to move it around or it could have the capability to be mounted on a wall. It could range in size from approximately 8×6×4" to 16×12×8".

On the guitar case 1, a decorative element 202 (illustrated in FIG. 20) can be placed on the window 2, such as with fasteners 201. Examples of decorative elements include a corner plaque 14 with two perpendicular sides, and optionally curved and/or multi-circular sides connecting the two perpendicular sides (decorative element 202). The decorative element 202 can also include an element 202 that takes 1% to 30% of the window space, such as 5% to 25%. The decorative element 202 can be limited to the top half of the corner and/or predominantly to the left or the right side of the window. The decorative element 202 can have perpendicular sides that are connected to each other with regular and/or irregularly shaped side(s).

The decorative element 202, such as a flat panel, can have a thickness of less than 1 inch. The decorative element 202 can be made from a number of materials, such as a metal, including copper. The metal can be plated with gold, silver, black chrome, or nickel.

One or more electronic components can be attached to the decorative element 202. These electronic components attached to the decorative panel can include one or more speakers 8, and a circuit board. The decorative panel and the window itself can have a void portion (made by cutting) that makes the speaker exposed to the outside of the case. One or more knobs 13, such as for powering on/off and/or adjusting volume/lighting can be placed on the outside, directly attached to the panel 202. A circuit board 50 can be attached to the inside of the panel 202, such as in a perpendicular or parallel fashion. The panel can be opaque and can block viewing of the electronics inside of the guitar case. The panel can also have another void so that a status indicator can be viewed, such as for the status of a battery, volume, power, input, or output.

(Tone Case) One version can simply contain the sound amplification system only. This one could still use Bluetooth, and VHF transmitting to play through the speaker. This would not have LED lighting or clear This can also have an input jack to connect to the guitar directly. This can also have an output jack to connect with headphones or an external speaker.

(Temple Case) One version can simply contain the display and LED features only. This LED configuration could be controlled only by remote control. This could also be controlled by the signal from a built in microphone.

(Temple of Tone Case) One version could combine both the previous two versions. It could have the LED lights, the clear display, and the sound amplification and speakers. The LED lights could be controlled by the sound inputs, including input jack, VHF transmitter and Bluetooth.

What is claimed is:

1. A guitar case comprising:
   a) a body for placement of a guitar;
   b) a pivoting door with a translucent or transparent window where a portion of the guitar is visible from outside of the case; and
   c) LED strips inside of the case along at least a portion of the window;
wherein the guitar placed inside of the case is lit up by the LED strips along the window.

2. The guitar case of claim 1, further comprising a panel or a screen.

3. The guitar case of claim 2, wherein the screen is a touch-screen.

4. The guitar case of claim 2, wherein the panel is configured to move to allow access to electronics inside of the case.

5. The guitar case of claim 4, wherein the panel pivots out.

6. The guitar case of claim 1, further comprising a camera or a microphone.

7. The guitar case of claim 1, wherein the case is configured so that the guitar is placed at an angle of less than vertical.

8. A guitar case comprising:
   a) a body for placement of a guitar;
   b) a door pivotally attached to the body, the door having a translucent or transparent window on the door where a portion of the guitar is visible from outside of the case;
   c) a speaker placed on the door;
wherein the guitar placed inside of the case is configured to play over the speaker with a wired or wireless connection.

9. The guitar case of claim 8, wherein the window is wider on bottom of the door where a body of the guitar faces, and the window is narrower on top.

10. The guitar case of claim 9, wherein the speaker is placed next to the narrow portion of the guitar case.

11. The guitar case of claim 8, further comprising a fan.

12. The guitar case of claim 8, further comprising a panel or a screen on the door.

13. The guitar case of claim 12, wherein the screen is a touch-screen.

14. The guitar case of claim 12, wherein the panel is configured to move to allow access to electronics inside of the case.

15. The guitar case of claim 14, wherein the panel pivots out.

16. The guitar case of claim 8, wherein the case is configured so that the guitar's neck is placed next to the speaker.

17. The guitar case of claim 16, wherein the case is configured so that a guitar is placed at an angle of less than vertical.

18. A decorative fixture for mounting on a wall comprising:
   a) a hollow body;
   b) a door pivotally attached to the body;
   c) a translucent or transparent window on the door; and
   d) an outside facing speaker placed on the door; and
wherein a user can pair a guitar with the speaker to play music.

* * * * *